United States Patent [19]

Sicre

[11] 4,071,893
[45] Jan. 31, 1978

[54] FLYING METHOD AND SYSTEM USING TOTAL POWER FOR AN AIRCRAFT

[75] Inventor: Jean-Luc Sicre, Meudon la Foret, France

[73] Assignee: Societe Francaise d'Equipements pour la Navigation Aerienne, Velizy-Villacoublay, France

[21] Appl. No.: 703,006

[22] Filed: July 6, 1976

[51] Int. Cl.² .......................... G06G 7/78; B64C 13/50
[52] U.S. Cl. ..................................... 364/427; 244/181
[58] Field of Search ........................ 235/150.22, 150.2; 73/178 R, 178 T; 244/180, 181, 182

[56] References Cited

U.S. PATENT DOCUMENTS

| | | | |
|---|---|---|---|
| 3,681,580 | 8/1972 | Gwathmey et al. | 235/150.22 |
| 3,691,356 | 9/1972 | Miller | 235/150.22 |
| 3,800,127 | 3/1974 | Knemeyer | 235/150.22 |
| 3,822,047 | 7/1974 | Schuldt, Jr. | 235/150.22 X |

*Primary Examiner*—Edward J. Wise
*Attorney, Agent, or Firm*—Scully, Scott, Murphy & Presser

[57] ABSTRACT

A flying method using total power, in particular for the take-off and overshoot of an aircraft, is disclosed in which the aerodynamic gradient $\gamma a$ is governed by reference to a desired gradient $\gamma d$ which is the total gradient $\gamma t$ modulated by the difference between the aircraft speed V and a reference speed $V_2$. An error signal $\delta$ representative of the difference between the aerodynamic gradient $\gamma a$ and the desired gradient $\gamma d$ is displayed. The display of the desired gradient $\gamma d$ may be by means of the pitching tendency bar of an artificial horizon for example.

22 Claims, 18 Drawing Figures

FLYING METHOD AND SYSTEM USING TOTAL POWER FOR AN AIRCRAFT

The present invention relates to a flying method and system, in particular for take-off or overshoot of an aircraft, using the total power.

Generally, apart from radio guidance apparatus or the like, aircraft which are equipped for flying blind necessarily comprise three basic instruments, in particular as regards take-off, namely:

a flight control horizon which makes it possible to visualise the attitudes of the aircraft and which consequently provides information about the stability materialised by the position of a model with respect to a moving sphere and the information of the flight control device which is visualised by tendency bars (the information of the flight control device being provided by a computer).

an anemometer which indicates the relative speed of the aircraft with respect to the air, and a variometer which measures the vertical component of the speed, i.e. the ascending speed or descending speed.

Thus, by using these three instruments, the pilot is able to undertake all the take-off operations manually, even in the case of poor visibility (nevertheless complying with the minimum limits of visibility on the runway from the flight manual.)

Before effecting take-off, it is known that the pilot is in possession of a certain number of data relating to the aircraft, (mass, chosen position of the flaps), to the mechanics (occasional conditions such as de-icing etc . . . ), to the meteorological or geographical conditions, to possible obstacles on the ground and finally to the runway, these data enabling him to calculate three essential speeds for take-off, namely a speed $V_1$, a speed $V_2$ and a speed of rotation Vr which will be referred to hereafter.

When in possession of these data, the pilot may proceed with the aircraft take-off. To this end, one in the centre of the runway and after having reached an adequate engine condition which, generally, in the case of jet engines, corresponds to a maximum thrust or close to the latter, the aircract begins the stage of travelling along the ground, during which its speed increases progressively.

In the case of a normal take-off, as soon as the aircraft reaches the speed of rotation Vr, the pilot actuates the rudders and ailerons and the aircraft takes-off several instants after at a speed Vloff. From the time when the aircraft has taken-off, the pilot must scan alternately the three afore-mentioned navigational appliances, in order to reach and maintain a speed $V_2$ + 10 knots or to maintain a stable longitudinal position $0_1 = 18°$ which thus corresponds to a speed greater than $V_2$ + 10 knots.

If there is a breakdown in one of the engines at the time of take-off, the proceedure is then as follows:

In the case where, at the time of the breakdown, the aircraft has not yet reached the speed $V_1$, the pilot must abandon take-off and must brake in order to stop the aircraft before the end of the runway.

In the case where the breakdown occurs after the aircraft has exceeded the speed $V_1$, since the aircraft is no longer able to stop under normal conditions before the end of the runway, the pilot must continue take-off and, after rotation, the pilot must seek to reach and maintain the speed $V_2$.

To obtain and maintain the speed $V_2$ + 10 knots, in the case of normal take-off, or the speed $V_2$ in the case where an engine fails, the surveyance which the pilot must assume may be considerably simplified by using the flight control device.

In this case, the pilot's work consists of bringing the longitudinal tendency bar (pitching) of the flight control device to zero and of keeping it at zero. The movement of the longitudinal bar above or below the model thus indicating an order to fly tail-down or an order to dive.

The invention thus relates to a method and system for flying an aircraft by means of a flight control device, in particular as regards take-off and overshoot.

According to the invention, this method consists essentially of governing the aerodynamic gradient $\gamma a$ of the aircraft by a desired gradient $\gamma d$ which is in turn the total gradient $\gamma t$ modulated by the variation of the aerodynamic speed V with respect to a reference value $V_2$ and of displaying the error signal $\delta$ between the aerodynamic gradient $\gamma a$ and the desired gradient $\gamma d$ by means of the pitching tendency bar of a flight control horizon.

The method thus uses the total gradient $\gamma t$ which represents the gradient which the aircraft should assume to maintain its constant speed in rectilinear flight and which is expressed as follows:

$$\gamma t = \frac{1}{g} (jx \cos\alpha - jz \sin\alpha)$$

in which:

$\alpha$ is the incidence of the aircraft, $jx$ is the acceleration on the axis of bank, $jz$ is the acceleration on the axis of jaw and $g$ is the acceleration of gravity.

Generally, the measurement of $\gamma t$ may be undertaken in a computer, from the real incidence and an accelerometric box comprising at least two accelerometers whose perceptible axes are respectively parallel to the axis of bank (detection $jx$) and the axis of yaw (detection $jz$).

To this end, the information of a total power variometer may be used to advantage, which provides in particular:

Information relating to the total gradient $\gamma t$, and

Information relating to the aerodynamic gradient $\gamma a$, (which is equal to the algebraic difference between the stable position $\theta_1$ and the incidence $\alpha$ (French Convention sign).

Furthermore, it is known that aircraft are equipped more and more frequently for inertial navigation and consequently comprise a central inertial unit providing, inter alia, a signal representative of the ground speed Vs of the aircraft, from which may be calculated in a relatively simple manner, the value of the total gradient $\gamma t$.

The invention therefore relates to the realisation of a circuit making it possible to calculate the total gradient $\gamma t$ from the speed Vs of the aircraft, whose value is provided by a central inertial unit provided in the aircraft, in order to prevent the use of a redundant accelerometric box.

To achieve this result, the invention uses mainly the following formulae, assuming zero side-slip of the aircraft and that the wings are horizontal, $$\gamma t = \frac{1}{g} \frac{dVs}{dt} + \sin \gamma a$$

-continued
$$\gamma t \neq \frac{1}{g} \frac{dVs}{dt} + \gamma a$$

According to these relationships, the value of $\gamma t$ may be obtained by forming the sum of a magnitude proportional to the derivative with respect to time of the speed Vs and of the value of the aerodynamic gradient $\gamma a$ which, as above-mentioned, may be obtained by forming in conventional manner, the algebraic difference between the stable position $\theta_1$ and the incidence $\alpha$.

It should be noted in this respect that in the simplest case and in the hypothesis where the calculation of the value of $\gamma t$ is not indispensable and does not serve to ensure the detection of an engine failure, the calculation of $\gamma a$ is not necessary. In fact, if we substitute the value $$\frac{1}{g} \frac{dVs}{dt} + \gamma a$$

of the value $\gamma t$, the control $\gamma d - \gamma a = 0$ may be written successively in an equivalent manner:

$$\gamma t - k(V - V_2) - \gamma a = 0$$
$$\frac{1}{g} \frac{dVs}{dt} + \gamma a - k(V - V_2) - \gamma a = 0$$
$$\frac{1}{g} \frac{dVs}{dt} - k(V - V_2) = 0$$

which consists of controlling the derivative dVs/dt by a magnitude proportional to the difference $(V - V_2)$.

According to a feature of the invention, in order to take into account the two previously mentioned imperatives, namely the speed $V_2 + 10$ knots (or $V_2$ in the case of an engine failure) and the angle $\theta = 18°$, the error signal $\delta$ is transmitted to a comparator which compares it with a difference signal $\delta_1$ proportional to $(\theta_1 - 18°)$ and to a reference signal $\delta_2$, corresponding for example to a constant order to dive by 20° and which effects the control of the longitudinal tendency bar of the flight control device by selecting from the signals $\delta$, $\delta_1$, $\delta_2$, the signal whose instantaneous value is comprised between that of the other two.

The present invention also relates to the realisation of a device for detecting and protecting against active or dormant breakdowns, which could occur in the previously described flying system using total power, in particular when they are translated by values of the signal $\delta$ causing erroneous orders to dive, which lead the pilot to impart a dangerous negative aerodynamic gradient to the aircraft.

In contrast to an active breakdown which becomes apparent and as soon as it appears disturbs the member controlled, possibly the pitching tendency bar of the flight control horizon, a dormant breakdown is intended to mean a breakdown affecting a circuit which operates and acts on the controlled member only under certain particular conditions which only occur occasionally.

A breakdown occurring in the circuit for detecting engine failures in the aircraft may be mentioned as an example of a dormant breakdown in the flying system in question. For example, a breakdown of this circuit causing, under all conditions, the multi-engined state, will have an effect only when an engine failure actually occurs. It is thus clear that if they are not detected in time, such dormant breakdowns may have particularly serious consequences from the point of view of safety.

The object of the invention is therefore, on the one hand, in the case where an active breakdown occurs and in particular a breakdown occurring in the chain providing the error signal $\delta$, to prevent the pitching tendency bar from leading to information less than a minimum safety gradient and on the other hand, to indicate the existence of this breakdown in order that the pilot is not wrongly informed and may thus make the necessary corrections.

To achieve these results, the invention proposes a device providing protection against abnormal negative gradients of the aircraft due in particular to poor operation of the flying system providing the signal $\delta$ and which uses the properties of said comparator.

According to this device, the input $\delta_2$ of the comparator is connected to a circuit providing a signal $K(\gamma a - \delta o)$ in which K is an adjustment gain, $\gamma o$ is a value representing the minimum safety gradient, below which one should not descend.

According to another feature of the invention, this device also comprises a circuit making it possible, on the one hand, to detect at the output of the comparator, the presence of a signal $\delta 2$ when the latter is selected and on the other hand, to automatically disconnect the entire flying system when the signal $\delta_2$ remains selected at the end of a predetermined period of time.

A circuit of this type may comprise a subtractor arranged between the input $\delta_2$ and the output of the comparator and a logic circuit comprising a delay which disconnects the flying system when the differential signal provided by said subtractor is cancelled and remains zero for a period of time greater than a predetermined period of time $\tau$.

Embodiments of the invention will be described hereafter, as non-limiting examples, with reference to the accompanying drawings in which.

Figure 7:
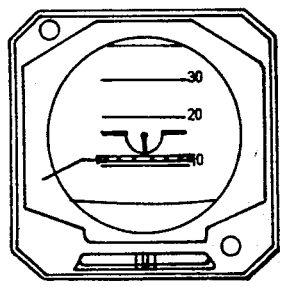
Figure 8:
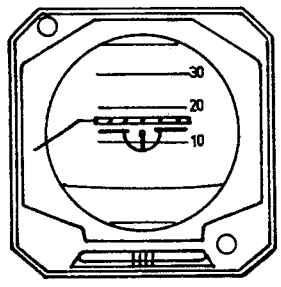
Figure 9:
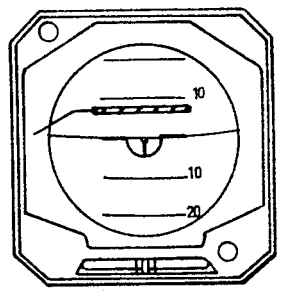
Figure 10:
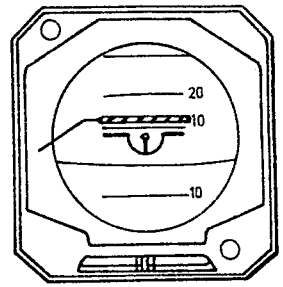
Figure 11:
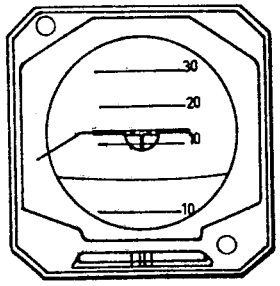
Figure 12:
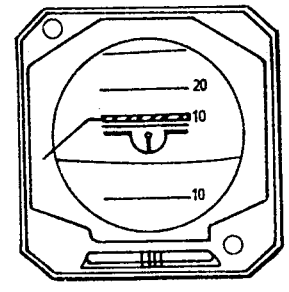
Figure 13:
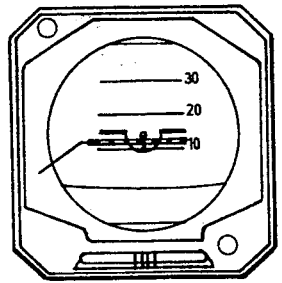
Figure 14:
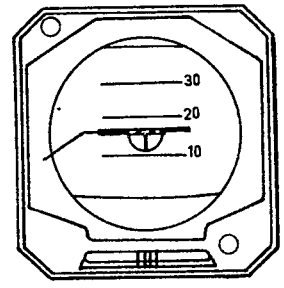
Figure 15:
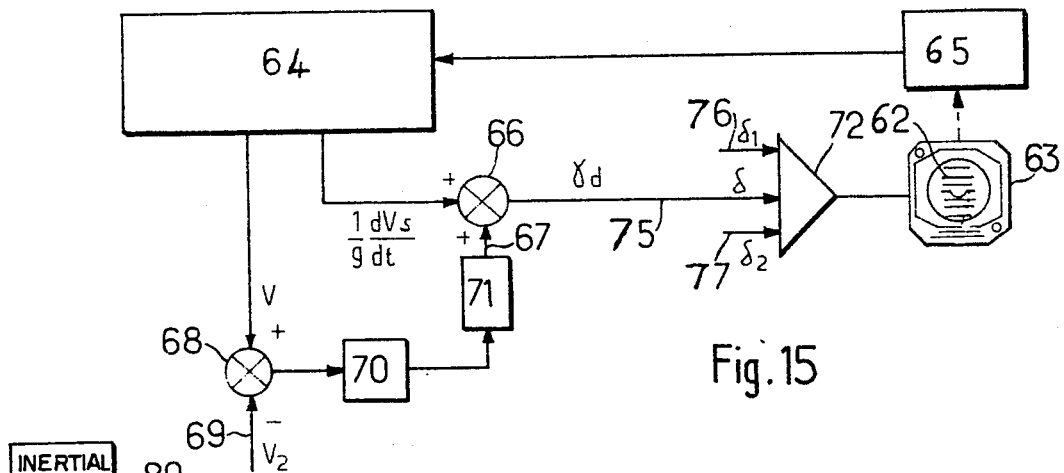
Figure 16:
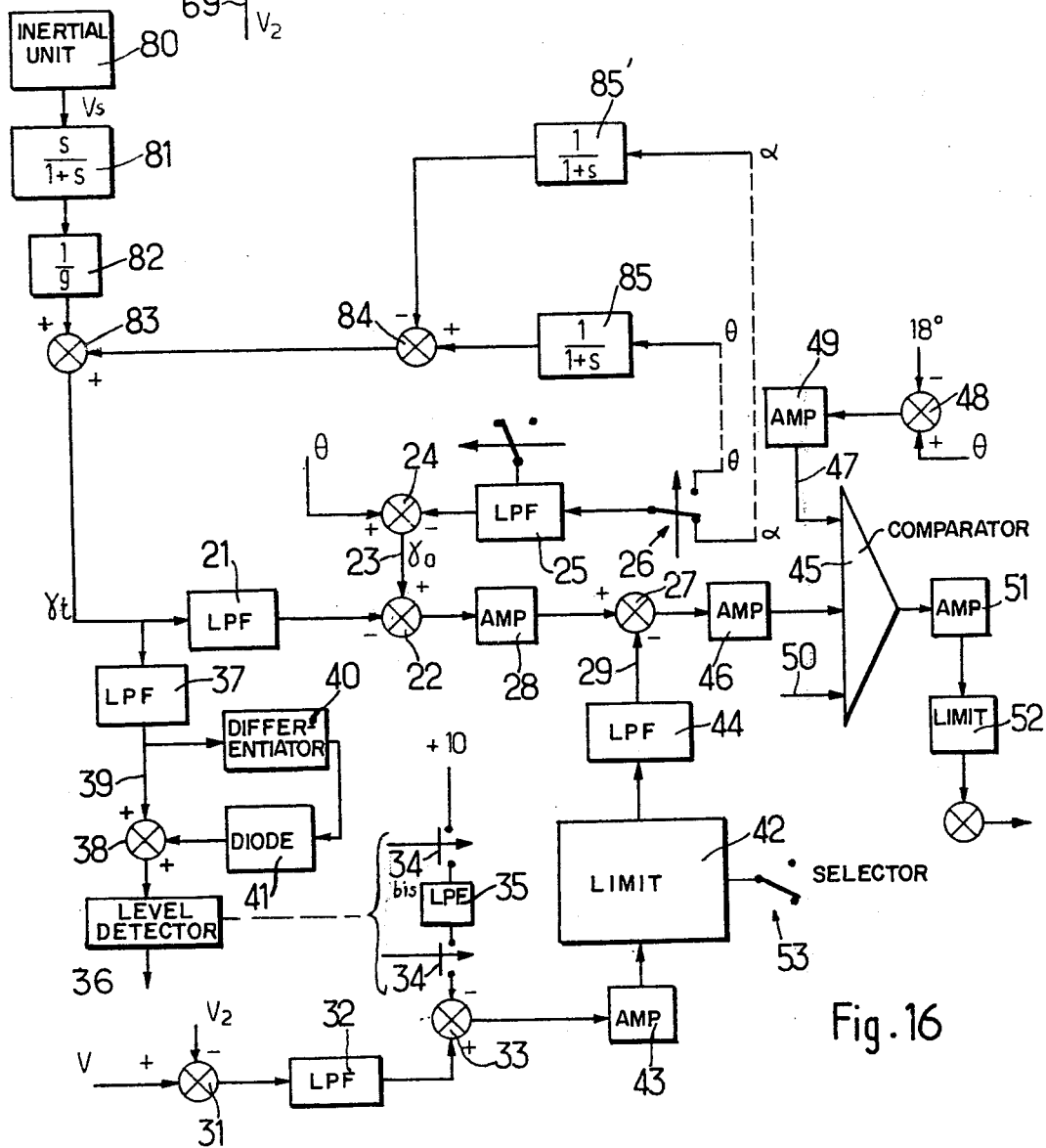
Figure 17:
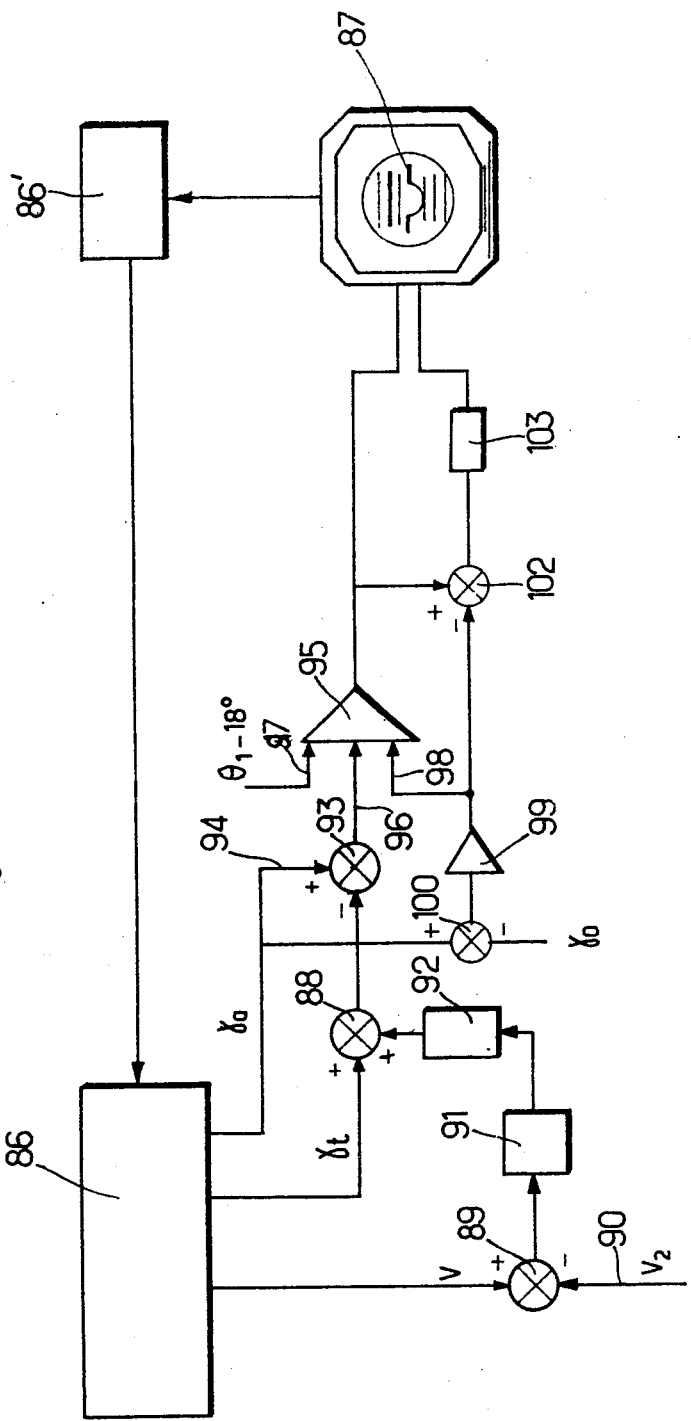
Figure 18:
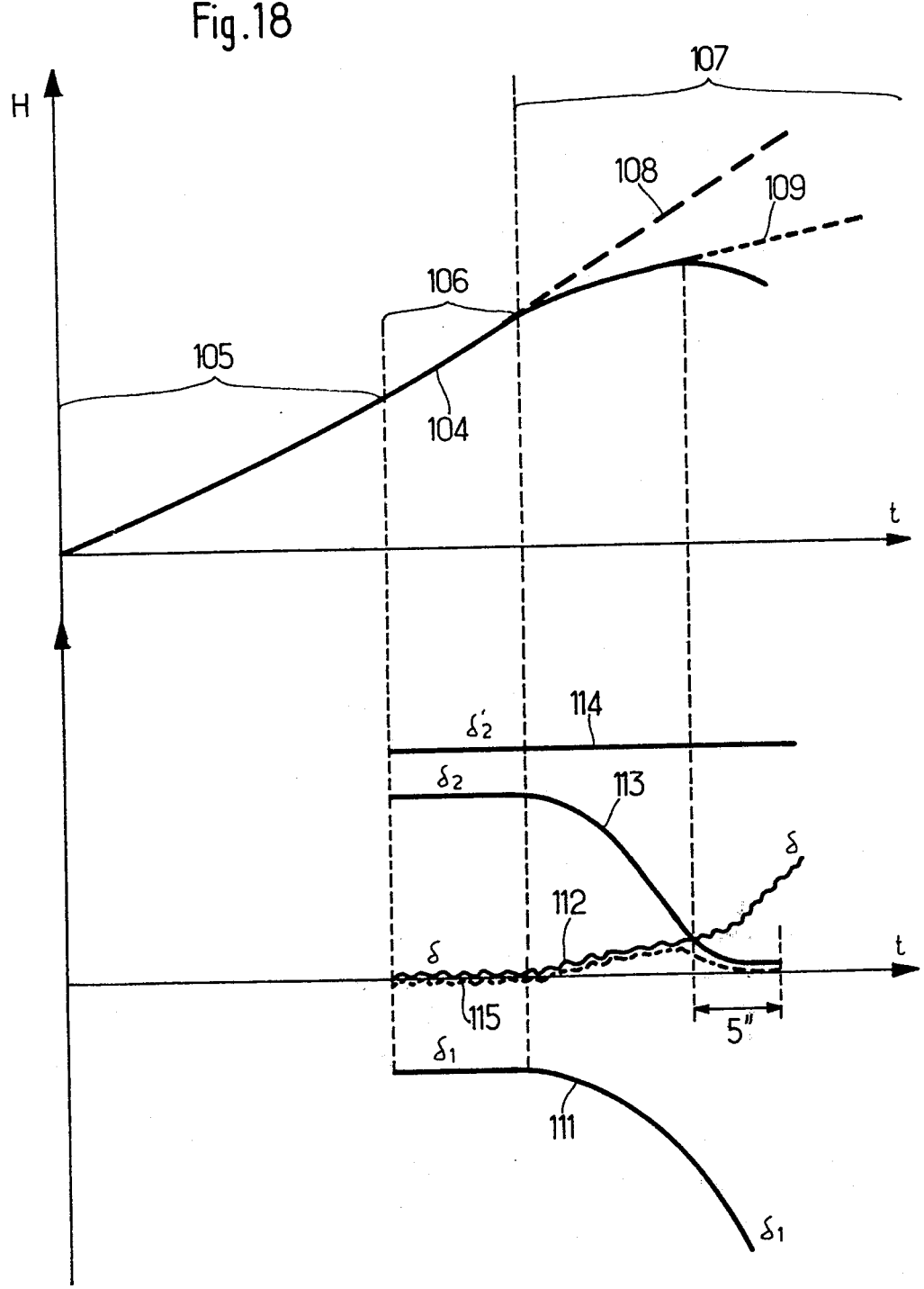

to the normal take-off of a twin-engined aircraft in FIGS. 3, 4, 5, 6, 7 and 8, to the take-off of a twin-engine aircraft with failure of one of the engines at the speed $V_1$, FIGS. 9, 10 and 11, to overshoot of a twin-engined plane, FIGS. 12, 13 and 14;

FIG. 15 is a circuit diagram making it possible to illustrate the principle of the flying system according to the invention, in its simplest version and in the case of an aircraft equipped with a central inertial unit;

FIG. 16 is a circuit diagram of a preferred embodiment of the system illustrated in FIG. 15;

FIG. 17 is a theoretical circuit diagram of a flying system using total power, equipped with a device for protecting against breakdowns;

FIG. 18 is a diagram representing: the trajectory of an aircraft in the course of take-off, during which poor operation of the flying system occurs;

the curve representative of the signal $\delta_1 = (\theta_1 - 18°)$ 1.5 ;

the curve representative of the signal $\delta$;

the curve representative of the signal $\delta_2 = K(\gamma a - \gamma o)$ and the curve representative of a signal $\delta_2$ corresponding to an order to dive by analogy with the signal $\delta_2$ mentioned in the main patent.

Figure 1:
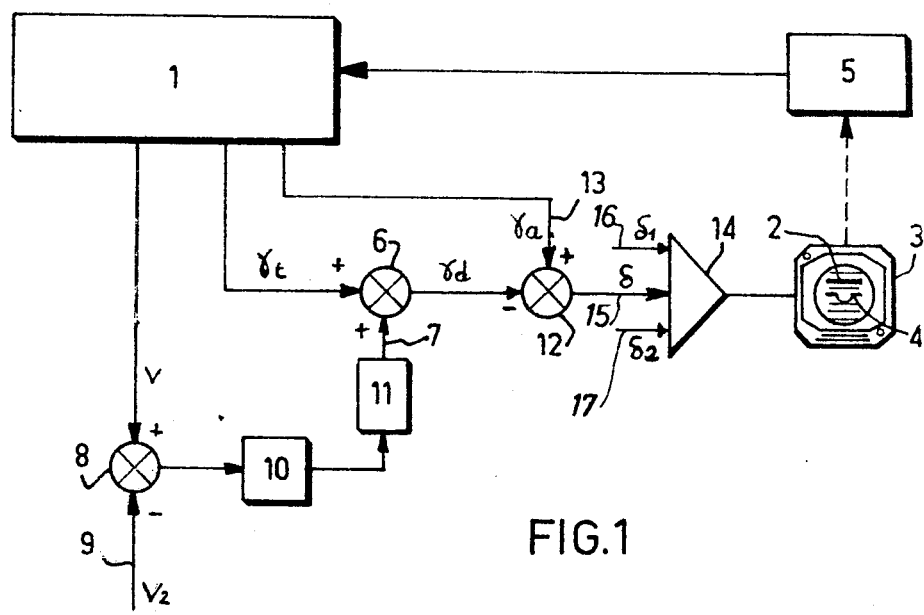
FIG. 1 is a circuit diagram making it possible to illustrate the principle of the flying system according to the invention, in the case where signals representative of the values $\gamma a$ and $\gamma t$ are available on board the aircraft.

With reference to FIG. 1, the flying system, in particular for take-off and overshoot of the aircraft (block 1), acts essentially on the pitching bar 2 (longitudinal tendency bar) of a flight control horizon 3 of convential type. It is known that the position of this tendency bar 2, with respect to the model 4, makes it possible to give the pilot either an order to dive or an order to fly tail-down or even, when the tendency bar 2 is superimposed on the model 4, that the aircraft 1 is in the desired configuration.

Depending on the indications of the artificial horizon 3, the pilot may act on the controls 5 of the aircraft 1 in order to obtain said superimposition and the action of the pilot is translated by a modification of the parameters of the aircraft 1 and, in particular, of the speed V, of the total gradient $\gamma t$ and of the aerodynamic gradient $\gamma a$ which, as above mentioned, are the three essential parameters used in the flying system using total power according to the invention.

The total gradient signal $\gamma t$ which may be obtained by a computer, from the actual incidence and two accelerometers whose perceptible axes are respectively parallel to the axis of bank (direction Jx) and the axis of yaw (detection Jz) is transmitted to an adder 6 which receives, at its second input 7, a signal corresponding to the variation of the speed V with respect to a reference value, for example $V_2 + 10$ knots or even only $V_2$. In the example illustrated, the speed signal V coming from an anemometer is transmitted to a subtractor 8 which receives, at its second input 9, a signal corresponding to the reference speed. The signal resulting from this difference is amplified (unit 10) and is then transmitted to an amplitude limiter 11 which effects a limitation of the minimum and maximum values of the difference. The amplitude limiter 11 is connected to the adder 6 whose output is connected to a subtractor 12 which receives a signal corresponding to the aerodynamic gradient $\gamma a$ at its second input 13.

A signal $\delta$ provided at the output of the substractor 12 is transmitted to a comparator 14 (whose function will be explained hereafter), which controls the pitching tendency bar 2 of the artificial horizon 3.

In this respect, it will be noted that one of the considerable advantages of this system consists in that it combines accelerometric information (calculation of $\gamma t$) and angular information (calculation of $\gamma a$) with anemometric information (calculation V) which react conversely at the time of squalls. Due to this, at the time of squalls, the differences exhibited by the accelerometric and angular information are compensated for by differences in the anemometric information and consequently, the flying system is not subject to any considerable disturbances.

If the operation of the comparator 14 is not taken into consideration and the latter is replaced by a simple electrical connection to the member for controlling the pitching bar 2 of the flight control horizon 3, the indications of the bar 2 may be interpreted as follows:

in the case where the signal $\delta$ provided by the subtractor 12 is positive, the pitching tendency bar 2 is located below the model 4, which corresponds to an order to dive.

The state $\delta > o$ signifies that $\gamma a$ is greater than $\gamma d$ and, consequently, inter alia, may result from two situations of the following types:

a. In the case where V = V reference and where $\gamma a > \gamma t$, the pitching bar 2 of the flight control device thus indicates an order to dive to restore $\gamma a$ to the value of $\gamma t$ in order to prevent deceleration;

b. In the case where V > V reference and $\gamma a = \gamma t$, the pitching bar 2 of the flight control device then indicates an order to dive to momentarily reduce $\gamma a$ in order to restore V to V ref.

In the case where the signal $\delta$ provided by the subtractor 12 is negative, the pitching tendency bar 2 is located above the model 4, which corresponds to an order to fly tail-down.

The state $\delta > o$ signifies that $\gamma a$ is smaller than $\gamma d$ and consequently, inter alia, may result from two situations of the following types:

c. In the case where V = V reference and where $\gamma a > \gamma t$, the pitching tendency bar 2 thus indicates an order to fly tail-down in order to restore $\gamma a$ to the value of $\gamma t$ in order to prevent acceleration;

In the case where V > V reference and $\gamma a = \gamma t$, the pitching tendency bar thus indicates an order to fly tail-down in order to momentarily increase $\gamma a$ in order to restore V to V reference.

As aforementioned, the operation which has been described does not take into account the action of the comparator 14.

This comparator 14 comprises three inputs, whereof one 15 is connected to the subtractor 12, the second 16 is connected to a circuit providing a signal $\delta_1$ proportional to the difference $\theta_1 - 18°$ ($\theta_1$ being the stable position), whereas the third 17 receives a reference signal $\delta_2$ corresponding in the embodiment described to an order to dive by 20°.

The function of the comparator 12 is to compare the signals applied thereto by its three inputs and to transmit to the member for controlling the pitching bar 2 of the flight control horizon 3, the signal whose value, at a given time, is comprised between the value of the two other signals, at the same time.

It should be noted that when the signal received by the input 16 (or stable position signal) is selected, if $\theta_1 > 18°$, the pitching tendency bar 2 gives an order to dive, on the other hand, if $\theta_1 > 18°$, the pitching tendency bar 2 gives an order to fly tail-down.

Figure 2:
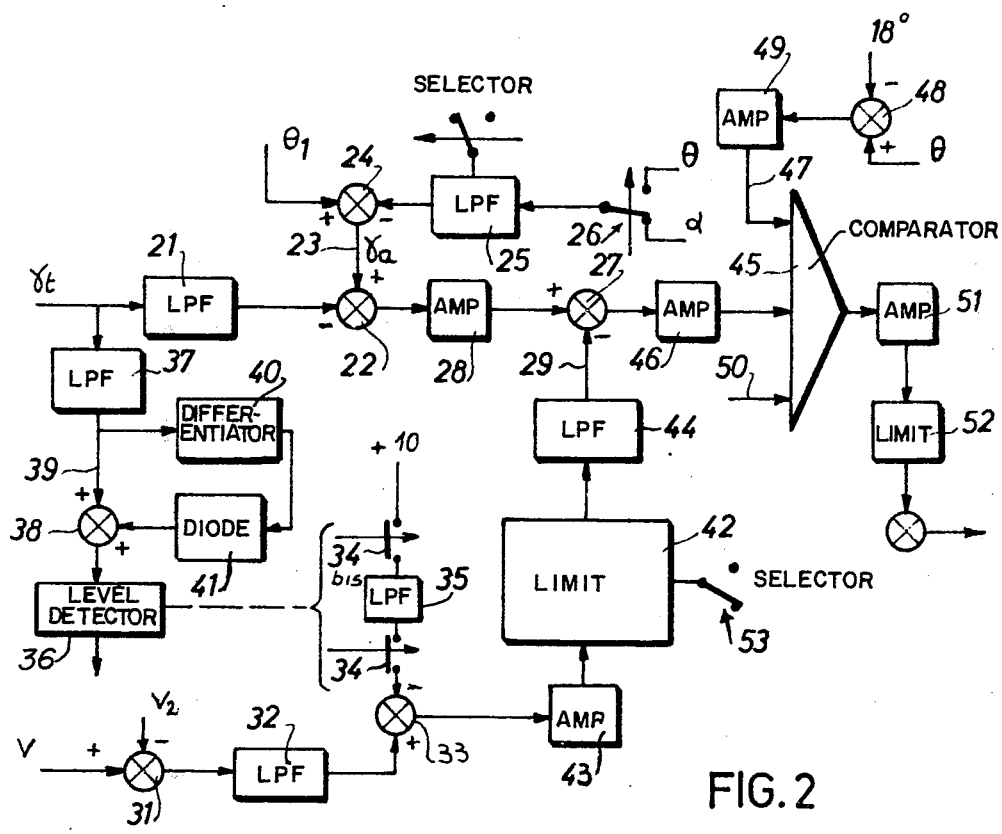
FIG. 2 is a circuit diagram of a preferred embodiment of the system illustrated in FIG. 1.

With reference to FIG. 2, which is a circuit diagram of one embodiment of the invention, the signal $\gamma t$ is transmitted by the intermediary of a low pass filter 21, to a subtractor 22 whose second input 23 receives the signal $\gamma a$ which, as above-mentioned, is equal to ($\theta_1 - \alpha$). Consequently, this signal $\gamma a$ is obtained by means of a subtractor 24 which receives, on the one hand, a signal representative of $\theta_1$ and, on the other hand, a signal representative of the incidence $\alpha$ which is filtered by means of a low pass filter 25. In order to take into account the conditions of travelling on the ground and flying conditions, and in order to prevent dragging errors due to high angular speeds of $\alpha$ during rotation, the circuit providing the signal representative of $\alpha$ comprises a commutation device which makes it possible:

on the one hand, to transmit to the subtractor 24 whilst travelling on the ground with the under-carriage collapsed (for example by means of a relay 26 controlled by a detector associated with the under-carriage) a signal representative of the stable position $\theta_1$ in place of the incidence $\alpha$ in order to obtain a virtually zero signal at the output of the subtractor 24.

and, on the other hand, to modify the time constant of the low pass filter 25 at the time of take-off. The signal supplied by the subtractor 22 is transmitted to a subtractor 27 after passing through an adaptation amplifier (unit 28). The second input 29 of this subtractor receives a signal depending on the difference V — V reference. The circuit which makes it possible to obtain this signal is composed firstly of a subtractor 31 which forms the difference (V – $V_2$), of a low pass filter 32 connected to the output of the subtractor 31, which serves mainly for filtering the speed signal V indicated. This low pass filter 32 is connected to a subtractor 33 which receives, through the intermediary of a commutation circuit, a constant signal corresponding to 10 knots. This commutation system may be constituted by a double commutator 34 and 34b with a low pass filter 35 controlled by a level detector 36 in order to eliminate the signal 10 knots in the case of an engine failure. The level detection circuit which operates after the signal $\gamma t$ is composed of a low pass filter 37 connected to an adder 38, on the one hand, by a direct connection 39 and, on the other hand, by a derivation circuit comprising a differentiation and filtering member 40 followed by a diode 41 connected to the adder 38. This derivation is particularly provided in order to increase the sensitivity of the level detector 36 when the derivative of $\gamma t$ is positive. The output of the adder 38 is connected to the level detector 36 which intervenes as above explained in the control logic of the double commutator 34 and 34b.

In particular, in the configuration where the leading edges are protruding (in the case of take-off), the operation of this level detector 36 is such that when the output of the adder 38 exceeds a calibrated value, for example 6°, the level detector 36 acts on the double commutator 34 and 34b to send the 10 knots signal to the subtractor 33. Conversely, when the value of $\gamma t$ drops below the value 6°, the level detector 36 acts on the double commutator to interrupt the 10 knots signal.

When the leading edges are retracted, the state of the level detector 36 has no effect on the commutator 34; in this case, the system is always governed by the indication V reference, which means that it can be used when cruising, in order to acquire the speeds indicated.

The subtractor 33 is connected by means of an amplifier 43 to a non-linear member 42, which serves as an amplifier limiter. The values of the amplitude limitations of 42 determine the rate of acceleration or deceleration imposed by the system during the stages of picking up the reference speed. The selector 53 makes it possible to modify the value of the limitations of 42 depending on the state of the level detector 36, on the position of the leading edges (and possibly on the condition "aircraft on the ground")

In particular, in the configuration of the leading edges projecting (case of take-off), the level detector 36 imposes wide limits when the output of the adder 38 exceeds 6° or narrow limits when $\gamma t$ drops below 6°. In this latter case, the limitation of negative sign is adjusted in order to constitute an implicit protection of the system against trajectories having a negative slope subsequent to an engine failure on take-off. In the configuration of the leading edges retracted (use during cruising) the level detector 36 is inoperative and wide limitations are imposed.

The output of the non-linear member 42 is connected to the subtractor 27 by means of a low pass filter 44.

The subtractor 27 is connected to the comparator 45, also by means of an adaptation amplifier 46.

At its second input 47, the comparator 45 receives a signal proportional to ($\theta_1$ — 18°) obtained by means of a subtractor 48 receiving the signal $\theta_1$ and the signal corresponding to 18°. This subtractor 48 is connected to the comparator 45 by means of an adaptation amplifier 49.

The third input 50 of the comparator 45 receives a constant reference signal corresponding for example to an order of 20°.

The output of the comparator 45 is connected to the member for controlling the pitching tendency bar of the flight control device by means of an adaptation amplifier 51 and a limiter 52 which makes it possible to authorise maximum displacement of the pitching tendency bar.

FIGS. 3 to 14 make it possible to illustrate the method of operation of the afore-described system, in particular as regards take-off and overshoot.

In a preliminary stage of take-off, before releasing the brakes, the pilot must record the speed $V_2$ which was previously established on the speed module of the control station of the automatic flying system. Then the system is activated by the action of the pilot (for example: engagement lever or blades of the throttle levers etc.)

Figure 3:
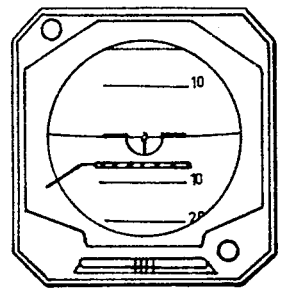
FIGS. 3 to 14 show the dial of a flight control horizon during the successive stages of flying an aircraft corresponding successively.

The artificial horizon thus has the configuration illustrated in FIG. 3, in which the pitching tendency bar gives an order to "dive," since only the limited term (V – $V_2$) is different from zero.

Figure 4:
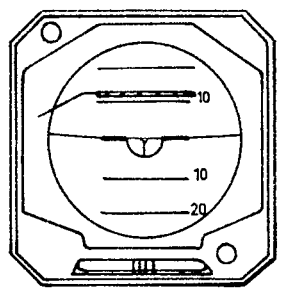

Whilst travelling on the ground, as soon as the brakes are released and the take-off thrust established, the total gradient $\gamma t$ increases (approximately 12°) and, consequently, the leve detector 36 causes the selection of $V_2$ + 10 knots. The tendency bar which is located approximately in the upper position thus indicates an order to fly tail-down and is maintained in this position approximately until rotation (FIG. 4).

Figure 5:
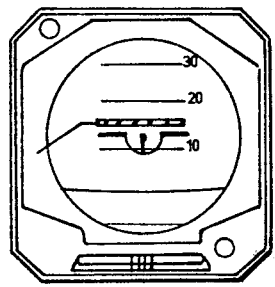

During rotation, owing to the fact that the total gradient decreases and the aerodynamic gradient increases, the pitching tendency bar begins to drop and this movement is accentuated upon take-off (FIG. 5.)

Figure 6:
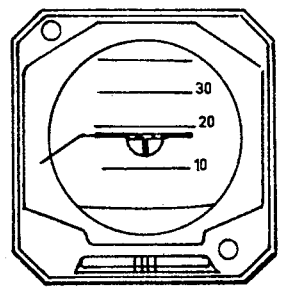

The pilot must then act on the flying controls in order to maintain the pitching tendency bar in coincidence with the model (FIG. 6).

Maintaining the position of the tendency bar firstly ensures the attainment of an acceleration at $V_2$ + 10 knots then;

either the retention of $V_2$ + 10 knots ($\theta_1$ being less than 18°);

or the retention of ($\theta_1$ at 18°) (with acceleration).

Once this flying configuration has been achieved, the pilot may proceed to accelerate from $V_2$ + 10 (or from $\theta_1$ = 18°) with the hyperlift devices retracted.

For this, as soon as the aircraft reaches a predetermined altitude, since it is stabilised at $V_2$ + 10 knots (or at $\theta_1$ = 18°), the pilot indicates a speed greater than $V_2$ on the speed module (for example 250 knots).

As soon as this speed is indicated, the system controls a constant acceleration which may correspond for example to keeping $\gamma a$ to 4° below $\gamma t$. This control is carried out, even under transitory operating conditions, such as the retraction of the hyperlift members.

Thus, at the beginning of acceleration, the pitching tendency bar gives an order to dive, i.e. an order to vary the stable position in order to bring $\gamma a$ to 4° below $\gamma t$ (FIG. 7).

After the retraction of the flaps, the pitching tendecy bar gives an order to fly tail-down in order to adjust the position of equilibrium, subsequent to the retraction of the flaps (FIG. 8).

The operation of the flying system according to the invention will now be studied in the case where there is a failure of one of the aircraft engines, which could occur either at the time of take-off, after reaching the speed $V_1$, or during the stage succeeding take-off and up to the stabilisation of the aircraft at a speed of $V_2 + 10$ knots (or $\theta_1 = 18°$).

In the case where failure occurs once the aircraft has been stabilised, after take-off at the speed $V_2 + 10$ knots, the system automatically selects (by means of the level detector 36) the speed $V_2$ as the reference speed. At this time, the total gradient $\gamma t$ is less than the gradient $\gamma a$ and gives an order ($a$) to dive, whereas the speed variation signal which passes from $V - (V_2 + 10)$ to $(V - V_2)$ gives an order ($b$) to fly tail-down. In this case, the order ($a$) is preponderant and consequently the pitching bar gives an order to dive. The pilot consequently acts to bring the pitching tendency bar into coincidence with the model in order to achieve and maintain the configuration $\gamma t = \gamma a$ and $V = V_2$.

In the case where the engine failure occurs between the speed $V_1$ and take-off, at the time of the failure, the drop of $\gamma t$ is preponderant with respect to the reduction of control over the speed variation and consequently the bar drops (FIGS. 9 to 10) which has the effect of warning the pilot of the failure and thus of the precautions which he must take at the time of rotation. At the time of rotation and take-off, the tendency bar continues to drop.

The pilot must act on his flying controls to bring and maintain the tendency bar in coincidence with the model, which corresponds to achieving and maintaining the speed $V_2$ (FIG. 11).

As afore-mentioned, the application of the flying system according to the invention is not limited to take-off manoeuvres. This system may also be suitable in the event of an overshoot during an approach.

In this case, the pilot no longer displays $V_2$ but a reference speed for the approach: V ref. On the speed module of the automatic flying system. When the pilot initiates the operation of overshoot he actuates blades, implanted on the throttle lever and provided for this operation. This action returns to the logic of the system, which may thus be used for controlling this stage.

Thus, at the time of rotation, which may be carried out manually or by following the flight control device, the pitching tendency bar is virtually zero (during a rotation at average speed (FIG. 12).

After rotation of the stable position, by means of the system according to the invention, the pilot is able to pick-up and maintain a speed of V ref. + 10 knots (or $\theta_1 = 18°$) (FIGS. 13-14.).

In this respect, in the case of a strong head wind, for example greater than 10 knots, it will be noted that the flying proceedure may command the display on the speed module of the flying system of: V ref plus an increase depending on the wind. It is thus this reference value (with or without 10 knots) which will thus serve for the system.

In the case where an engine failure occurs during overshoot, the control takes place at V ref in place of V ref + 10 knots, as previously.

This transformation takes place from the beginning if the engine failure occurs at the initial time of overshoot; or as soon as $\gamma t < 6$ degrees if the failure occurs several instants after overshoot.

Finally, the flying system according to the invention may be used to acquire a cruising speed. In this case, in a manner similar to the preceding, the speed to be attained is displayed on the speed module of the automatic pilot system for example. The indications of the pitching bar make it possible to achieve and maintain the reference speed displayed. Cruising is distinguished by the system by the condition of leading edges retracted (or any equivalent condition).

Finally, it will be noted that the system according to the invention facilitates more flexible and more reliable piloting of the aircraft. In particular, it makes it possible to pass asymptotically from one speed to another (for example from the speed $V_2 + 10$ knots to the speed $V_2$ during an engine failure) and this is without any oscillation.

With reference to FIG. 15, the flying system of the aircraft acts in a similar manner to that previously described, on the pitching bar 62 of the flight control horizon 63.

As previously mentioned, the aircraft shown diagrammatically with its control members, respectively by the units 64 and 65, comprises a central inertial unit providing a signal representative of the speed Vs. After having been derived with respect to time and multiplied by a coefficient equal to 1/g, this signal Vs is transmitted to an adder 66 which receives, at its second input 67, a signal corresponding to the difference between the anemometric speed V and a reference value V2.

In the example shown, the speed signal V coming from an anemometer is transmitted to a subtractor 68 which receives, at its second input 69, a signal corresponding to the reference speed.

The signal resulting from this difference is amplified (unit 70) and is then transmitted to an amplitude limiter 71 which carries out a variation limitation. The amplitude limiter 71 is connected to the adder 66, whose output is connected to a comparator 72 which controls the pitching tendency bar 62 of the flight control horizon 63.

The comparator 72 comprises three inputs, whereof one 75 is connected to the adder 66, the second input 76 is connected to a circuit providing a reference signal $\delta_1$ proportional to the difference $\theta_1 - 18°$ ($\theta_1$ being the stable position,) whereas the third input 77 receives a reference signal $\delta_2$ corresponding in the embodiment described to an order of 20°.

The function of the comparator 72 is to compare the signals which are sent to the latter on its three inputs and to transmit to the member for controlling the pitching bar 62 of the flight control horizon 63, the signal whose value, at a given time, is comprised between the value of the two other signals, at the same time.

The operation of the system which has been described is strictly identical to that relating to FIG. 1 and consequently will not be described again.

As shown in FIG. 16, the wiring diagram of the flying system is identical to that shown in FIG. 2, apart from the fact that instead of using a signal $\gamma t$ provided by an accelerometric box provided for this purpose, this signal $\gamma t$ is calculated from the speed signal Vs supplied by a central inertial unit 80.

This signal Vs coming from the central unit 80 is transmitted to a shunting device 81 also acting as a low pass filter for the transfer function $s/1 + s$ (s being the Laplace operator) and whose output is connected to an amplifier 82 for the gain 1/g.

This amplifier 82 is in turn connected to an adder 83 which at its second input also receives a signal representative of the gradient $\gamma a$. This signal $\gamma a$ is obtained by forming the difference $\theta - \alpha$ in a conventional manner, by means of a subtractor 84, after having filtered the signals $\theta$ and $\alpha$ by means of low pass filters 85 and 85' having a transfer function $1/1 + s$.

The signal $\gamma t$ provided by the adder 83 is transmitted to the low pass filters 21 and 37 of an identical circuit to that illustrated in FIG. 2. This circuit whose various parts have the same references as those in FIG. 2, will not be described again.

In the system for flying the aircraft illustrated, with its controls, by the blocks 86 and 86' (FIG. 17), the signal of total gradient $\gamma t$ which may be obtained in conventional manner from the actual incidence and two accelerometers, is transmitted to an adder 88 which receives, at its second input, a signal corresponding to the speed variation V with respect to a reference value, for example $V_2 + 10$ knots or even only $V_2$. To this end, the speed signal V, coming from an anemometer, is transmitted to a subtractor 89 which receives, at its second input 90, a signal $V_2$ corresponding to the reference speed. The differential signal, provided by the subtractor 89, is amplified (unit 91) and is then transmitted to an amplitude limiter 92 which carries out a limitation of the minimum and maximum values of the variation. The amplitude limiter 92 is connected to the adder 88 whose output is connected to a subtractor 93, which receives a signal corresponding to the aerodynamic gradient $\gamma a$ at its second input 94.

The signal $\delta$, provided at the output of the subtractor 93 is transmitted to a comparator 95, which controls the pitching tendency bar of the flight control horizon 87.

The comparator 95 comprises three inputs, whereof one 96 is connected to the subtractor 93, the second 97 is connected to a circuit providing a signal $\delta_1$ proportional to the difference $\theta_1 - 18°$ ($\theta_1$ being the longitudinal stable position), whereas the third input 98 receives a signal K ($\gamma a - \gamma o$) emanating from an amplifier 99 for an adjustment gain K, which receives the differential signal of a subtractor 100. On the one hand, this subtractor 100 receives a signal representative of the aerodynamic gradient $\gamma a$ taken for example from 94 and on the other hand, a signal $\gamma o$ representative of a gradient of predetermined value, for example 0.5°.

The signal provided by the amplifier 99 is also transmitted to a subtractor 102 which also receives the output signal of the comparator 95.

The differential signal provided by the subtractor 102 is transmitted to a logic unit 103 which acts on the flight control horizon 87, in order to cause the pitching tendency bar to disappear when said differential signal remains zero after a period of predetermined time, for example five seconds.

It must be stressed that the diagram which has been described is a very simplified theoretical diagram and that it may clearly be completed by all the devices afore-described. In particular, it may be equipped with a commutation device controlled by a circuit for detecting an engine failure, which enables the reference speed to assume two values, namely the value ($V_2 + 10$ knots) in the case of normal operation or the value $V_2$ in the case of an engine failure.

The diagram illustrated in FIG. 18 makes it possible to illustrate the action of the afore-described protection device, during the take-off of an aircraft, in the course of which a failure or poor operation of the flying system occurs during take-off.

This diagram firstly illustrates the trajectory of the aircraft, a curve which comprises:

a first part 105 corresponding to the phase during which the pilot seeks to reach the speed $V_2 + 10$ knots or the position $\theta_1 = 18°$;

a second part 106 corresponding to maintaining a speed of $V_2 + 10$ knots;

a third part 107 in which are located:

in broken line the trajectory 108 corresponding to normal operation, in full line the trajectory 104 corresponding to the system according to the main patent disturbed by poor operation, in broken line the trajectory 109 corrected by the protection action according to the invention in the case of poor operation.

This diagram also shows, in correlation with the trajectories 104, 108 and 109, the curves 111, 112 and 113 representing the signals $\delta_1$, $\delta$ and $\delta_2$, at the input of the comparator and a horizontal line 114 corresponding to a constant signal $\delta'_2$ indicating a considerable and constant order to dive.

It will thus be seen that after reaching the speed $V_2 + 10$ knots or $\theta_1 = 18°$, during the phase of maintaining this speed, the signals $\delta_1$, $\delta$ and $\delta_2$ are maintained at a substantially constant level and in the order $\delta_2 > \delta > \delta_1$ and, consequently, it is the signal $\delta$ which is selected (curve shown in broken line 115). As soon as a failure occurs in the circuit producing the signal $\delta$ and which is translated by an order to dive and by a decrease in the gradient of the aircraft, the value of the signal $\delta_2 = (\gamma o - \gamma a)$ K decreases and, at the end of a certain period of time, becomes less than the value of the signal $\delta$. In other words, there is an intersection of the curves $\delta$ and $\delta_2$. Beyond the point where the value of $\delta_2$ becomes less than the value of $\delta$, the value of $\delta_2$ is located between that of $\delta$ and $\delta_1$ and due to this, it is the signal $\delta_2$ which is selected (see curve shown in broken line 115).

Consequently, the flying system is governed by K($\gamma a - \gamma o$), which makes it possible to maintain an aerodynamic gradient $\gamma a$ and $\gamma o$. In practice the value of $\gamma o$ which constitutes the bottom aerodynamic gradient, below which one should not fall, is approximtely 0.5°.

Nevertheless, it is important to state that this bottom aerodynamic gradient corresponds to an abnormal flying configuration and consequently should not be maintained beyond a predetermined period of time. This is the reason why the logic unit 103 shown in FIG. 17 acts in a manner to cause the pitching tendency bar of the flight control horizon 87 to disappear, when the signal $\delta_2$ is selected at the end of a predetermined time, for example five seconds.

It is clear that this disappearance of the pitching tendency bar on the flight control horizon 87 warns the pilot of a failure existing in the flying system and causes him to undertake the necessary corrections immediately.

Although the present invention has been described with reference in particular to take-off and overshoot of an aircraft, it is equally applicable to any other situation in which the throttle of an aircraft is acted upon to increase the speed of the aircraft.

What is claimed is:

1. A flying method using total power, for an aircraft, and comprising the following steps, governing the aerodynamic gradient $\gamma a$ by reference to a desired gradient $\gamma d$, obtaining the desired gradient $\gamma d$ by modulating the total gradient $\gamma t$ by the difference between the aircraft speed V and a reference speed $V_2$, and displaying an error signal $\delta$ representative of the difference between the aerodynamic gradient γa and the desired gradient γd.

2. A flying method according to claim 1, wherein said step of displaying includes displaying said error signal δ by means of the pitching tendency bar of an artificial horizon.

3. A flying method according to claim 1, and further including calculating the total gradient γt from an accelerometric box.

4. A flying method according to claim 1, and further including calculating the total gradient γt from the speed Vs of the aircraft with respect to the ground, and providing the value of this speed Vs by a central inertial unit.

5. A flying method according to claim 4, and further including calculating γt from the formula:

$$\gamma t = \frac{1}{g} \frac{dVs}{dt} + \sin \gamma a$$

(g being the acceleration due to gravity), or the formula:

$$\gamma t \neq \frac{1}{g} \frac{dVs}{dt} + \gamma a$$

6. A flying method according to claim 5 and further including governing the derivative dVs/dt by a magnitude proportional to the difference (V − V₂) in which V is the aerodynamic speed of the aircraft and V₂ is the reference speed.

7. A flying method according to claim 1, and further including taking into account either the variation δ, intended to subject the speed V to the control of the reference value, or a variation of the stable position with respect to a reference position, and including transmitting the error signal δ to a comparator, comparing δ in the comparator with a signal δ₁ corresponding to said variation of position and with a constant reference signal δ₂ and controlling the longitudinal tendency bar of the artificial horizon by the intermediate signal of the group (δ, δ₁, δ₂) i.e. the signal whose instantaneous value is between those of the other two signals.

8. A flying method according to claim 7, and utilizing a reference position which corresponds to θ₁ = 18° and a constant reference signal which corresponds to 20°.

9. A flying method according to claim 1, and utilizing a reference speed of at least two values, (V₂ + 10 knots) or V₂, these two values being interchangeable according to whether the total gradient γt is above or below a calibrated value.

10. A flying method according to claim 9, and utilizing a calibrated value of 6°.

11. A flying method according to claim 1, and including limiting the speed difference signal between positive and negative values.

12. A system for applying a flying method using total power, for an aircraft, and comprising the steps of governing the aerodynamic gradient δa by reference to a desired gradient δd, obtaining the desired gradient δd by modulating the total gradient δt by the difference between the aircraft speed B and a reference speed V₂, and displaying an error signal δ representative of the difference between the aerodynamic gradient δa and the desired gradient δd, and wherein a signal representative of the total gradient δt is transmitted to a first input of an adder which receives at a second input a signal corresponding to the difference between the speed V and a reference speed, the adder output being connected to a first input of a subtractor which receives at a second input, a signal corresponding to the aerodynamic graident δa, the subtractor output being transmitted to a comparator which is connected to a member for controlling the pitching tendency bar of the artificial horizon, and the comparator also receiving a signal representative of a variation of stable position and a reference signal.

13. A system according to claim 12, wherein the signal representative of the aerodynamic gradient is provided by a circuit which forms the difference between the stable position θ₁ and the incidence α, this circuit being able to comprise a commutation device controlled by a signal representing the state of the under-carriage, in order to substitute the stable position θ₁ for the incidence α when said under-carriage is collapsed, in order to cancel out said difference.

14. A system according to one of claim 12, wherein the signal corresponding to the variation between the speed V and the reference speed comprises a subtractor which subtracts from the speed V, provided by an anemometer, a reference speed V₂, the subtractor being connected to a first input of a second subtractor, having a second input connected to a source of reference voltage by means of a commutator controlled by a level detector of total gradient γt, the second comparator being connected to a non-linear member which serves as a limiter and which provides said speed variation signal.

15. A system according to claim 12, wherein the level detection circuit which operates from the signal γt is composed of a low pass filter connected to an adder by a direct connection and by a derivation circuit comprising a differentiation and filtering member followed by a diode, the output of the adder being connected to a level detector which ensures the control of said commutator.

16. A system according to claim 15, wherein the level detector is adapted to control the non-linear member.

17. A system according to claim 12, wherein the comparator is connected to a member for controlling the pitching tendency bar of the artificial horizon by means of a limiter.

18. A system according to claim 12, wherein, in order to ensure protection against abnormal negative gradients of the aircraft, due in particular to poor operation of the flying system circuit providing the signal δ, the input of the comparator corresponding to the signal δ₂ is connected to a circuit providing a signal K (γa − γo), in which K is an adjustment gain and γo is a value representative of a minimum safety gradient, below which one should not drop.

19. A system according to claim 12, comprising a detection device serving to detect at the output of the comparator the presence of the signal δ₂ when the latter is selected, and to disconnect the entire flying system when the signal δ₂ remains selected at the end of a predetermined period of time.

20. A system according to claim 12, wherein the input δ₂ of the comparator is connected to an amplifier for an adjustment gain K, which receives the differential signal of a subtractor, which in turn receives a signal representative of the aerodynamic gradient γa and, a signal γo representative of a gradient of predetermined value.

21. A system according to claim 20, wherein the predetermined gradient value is 0.5°.

22. A system according to claim 20, wherein the amplifier for the gain K is connected to a subtractor which also receives the output signal of the comparator, and the differential signal provided by said subtractor is transmitted to a logic unit which acts on the flight control horizon in order to cause the pitching tendency bar to disappear when said differential signal remains zero for a period of time greater, than a predetermined period.

* * * * *